United States Patent
Kim et al.

(10) Patent No.: US 12,249,685 B2
(45) Date of Patent: Mar. 11, 2025

(54) ALL SOLID BATTERY

(71) Applicant: SAMSUNG ELECTRO-MECHANICS CO., LTD., Suwon-si (KR)

(72) Inventors: Kyung Lock Kim, Suwon-si (KR); Chang Ryul Jung, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 252 days.

(21) Appl. No.: 16/840,733

(22) Filed: Apr. 6, 2020

(65) Prior Publication Data
US 2021/0167418 A1    Jun. 3, 2021

(30) Foreign Application Priority Data
Nov. 28, 2019    (KR) .................. 10-2019-0155227

(51) Int. Cl.
*H01M 10/0562*    (2010.01)
*H01M 4/02*    (2006.01)
*H01M 4/131*    (2010.01)
*H01M 4/134*    (2010.01)
*H01M 4/36*    (2006.01)
(Continued)

(52) U.S. Cl.
CPC ....... *H01M 10/0562* (2013.01); *H01M 4/131* (2013.01); *H01M 4/134* (2013.01); *H01M 4/366* (2013.01); *H01M 4/505* (2013.01); *H01M 4/525* (2013.01); *H01M 10/0525* (2013.01); *H01M 2004/021* (2013.01)

(58) Field of Classification Search
CPC ............... H01M 10/05–0562; H01M 10/0525; H01M 4/02–131; H01M 4/505; H01M 4/525; H01M 4/134; H01M 4/366
See application file for complete search history.

(56) References Cited

U.S. PATENT DOCUMENTS

| | | | |
|---|---|---|---|
| 2008/0213674 A1 | 9/2008 | Okada et al. | |
| 2008/0220334 A1 | 9/2008 | Inda | |
| 2011/0300443 A1* | 12/2011 | He | H01M 4/0404 252/500 |

(Continued)

FOREIGN PATENT DOCUMENTS

| | | |
|---|---|---|
| CN | 101174698 A | 5/2008 |
| CN | 102844930 A | 12/2012 |

(Continued)

OTHER PUBLICATIONS

"Xiang-Wu Zhang, Characteristics of lithium-ion-conducting composite polymer-glass secondary cell electrolyte, Jun. 11, 2002, Journal of Power Sources 112 (2002) 209-215" (Year: 2002).*

(Continued)

*Primary Examiner* — Niki Bakhtiari
*Assistant Examiner* — Niara Trant
(74) *Attorney, Agent, or Firm* — Morgan, Lewis & Bockius LLP

(57) ABSTRACT

An all-solid battery includes a body including a solid electrolyte layer and an anode layer and a cathode layer alternately stacked with the solid electrolyte layer interposed therebetween, and first and second external electrodes disposed on external surfaces of the body. The anode layer and the cathode layer include an active electrode material. The active electrode material included in the anode layer and the cathode layer is the same non-polar-based material.

15 Claims, 2 Drawing Sheets

(51) Int. Cl.
  *H01M 4/505* (2010.01)
  *H01M 4/525* (2010.01)
  *H01M 10/0525* (2010.01)

(56) References Cited

U.S. PATENT DOCUMENTS

| | | |
|---|---|---|
| 2013/0017435 A1 | 1/2013 | Sato et al. |
| 2014/0162113 A1 | 6/2014 | Ohta et al. |
| 2015/0333376 A1 | 11/2015 | Gaben |
| 2017/0207460 A1* | 7/2017 | Hama ............... H01M 10/0562 |
| 2019/0131654 A1* | 5/2019 | Ito ..................... H01M 10/0585 |
| 2019/0260070 A1* | 8/2019 | Kishimoto ........... H01M 4/133 |
| 2020/0020898 A1* | 1/2020 | Yi ....................... H01M 50/209 |
| 2020/0185768 A1* | 6/2020 | Kang ................. H01M 10/0585 |
| 2020/0227780 A1 | 7/2020 | Nakamura |

FOREIGN PATENT DOCUMENTS

| | | |
|---|---|---|
| CN | 104904039 A | 9/2015 |
| JP | 2011-216235 A | 10/2011 |
| JP | 2018-156941 A | 10/2018 |
| KR | 10-2008-0039296 A | 5/2008 |
| KR | 10-2017-0069071 A | 6/2017 |
| KR | 10-2017-0071236 A | 6/2017 |
| KR | 10-2018-0105007 A | 9/2018 |
| KR | 10-2019-0053126 A | 5/2019 |
| WO | 2012/176808 A1 | 12/2012 |
| WO | 2019/093215 A1 | 5/2019 |

OTHER PUBLICATIONS

Office Action issued in corresponding Korean Patent Application No. 10-2019-0155227 issued May 6, 2021, with English translation.
Office Action and Search Report issued in corresponding Chinese Patent Application No. 202010517970.4 dated Aug. 5, 2024, with English translation.
Office Action and Search Report dated Jan. 9, 2025, issued in corresponding Chinese Patent Application No. 202010517970.4 with an English translation.

* cited by examiner

I - I'

A

ALL SOLID BATTERY

CROSS-REFERENCE TO RELATED APPLICATION(S)

This application claims the benefit under 35 USC 119(a) of Korean Patent Application No. 10-2019-0155227 filed on Nov. 28, 2019 in the Korean Intellectual Property Office, the entire disclosures of which are incorporated herein by reference for all purposes.

TECHNICAL FIELD

The present disclosure relates to an all-solid battery.

BACKGROUND

Lithium (Li)-ion batteries with high energy density are in use as power sources for portable electronic devices such as laptop computers, smartphones and the like.

Recently, Li-ion batteries have become larger due to having been used in hybrid cars and power storage devices, and in this case, higher energy density and output density are required, and safety issues are attracting attention.

All-solid-state batteries using non-flammable or flame-retardant solid electrolytes are attracting attention as a technology for solving safety concerns due to the large-size and high energy density of lithium ion batteries, and since related art flammable organic liquid electrolytes are not used, it is expected that a drastic improvement in battery safety will be possible.

In the case of an all-solid battery using an oxide-based material as a solid electrolyte, reflow soldering may be mounted on a substrate, and thus, there is a high degree of freedom in circuit design in a substrate as in passive components.

On the other hand, an all-solid battery basically requires a positive electrode, an electrolyte, and a negative electrode, and requires a current collector layer although there is a difference depending on the structure.

The all-solid battery operates when voltage is applied. In this case, lithium ions (Li+) of the positive electrode are detached and inserted into the negative electrode, so that the movement from one electrode to the other is repeated.

In this case, the electrolyte layer is a medium for allowing lithium ions (Li+) to move back and forth, like on a bridge, and has the same role as the liquid electrolyte of a related art lithium ion battery.

For example, the solid electrolyte may be referred to serving as both the electrolyte and the separator.

Therefore, in all solid-state batteries currently under development, research is needed to study materials to which low-temperature co-sintering processes may be applied, to prevent interfacial side reactions between electrodes and electrolytes, to improve interlayer adhesion, and to improve reliability of all-solid-state batteries.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

An aspect of the present disclosure is to provide an all-solid battery having high ion conductivity and improved reliability.

According to an aspect of the present disclosure, an all-solid battery includes a body including a solid electrolyte layer and an anode layer and a cathode layer alternately stacked with the solid electrolyte layer interposed therebetween, and first and second external electrodes disposed on external surfaces of the body. The anode layer and the cathode layer include an active electrode material. The active electrode material included in the anode layer and the cathode layer is the same non-polar-based material.

BRIEF DESCRIPTION OF THE DRAWINGS

The above and other aspects, features, and advantages of the present disclosure will be more clearly understood from the following detailed description, taken in conjunction with the accompanying drawings, in which.

DETAILED DESCRIPTION

Figure 1:
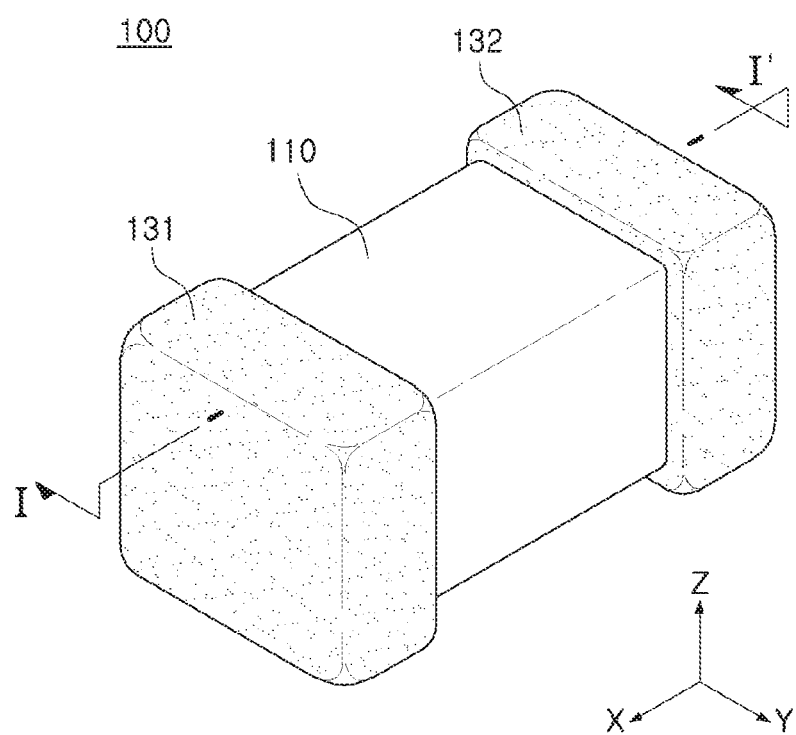
FIG. 1 is a perspective view of an all-solid battery according to an embodiment of the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there may be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

The drawings may not be to scale, and the relative size, proportions, and depiction of elements in the drawings may be exaggerated for clarity, illustration, and convenience.

Subsequently, examples are described in further detail with reference to the accompanying drawings.

In the drawing, the X direction may be defined as the second direction, the L direction or the longitudinal direction, the Y direction as the third direction, the W direction or the width direction, and the Z direction as the first direction, the stacking direction, the T direction, or the thickness direction.

All-Solid Battery

FIG. 1 schematically illustrates a perspective view of an all-solid battery according to an embodiment.

Figure 2:
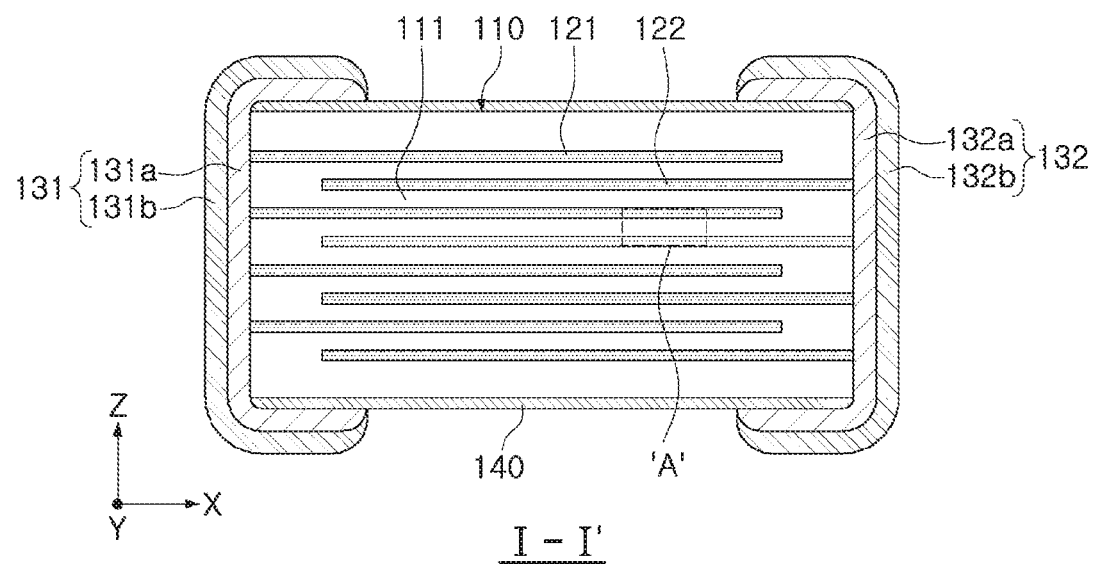
FIG. 2 is a cross-sectional view taken along line I-I' of FIG. 1.

FIG. 2 is a cross-sectional view taken along line I-I' of FIG. 1.

Figure 3:
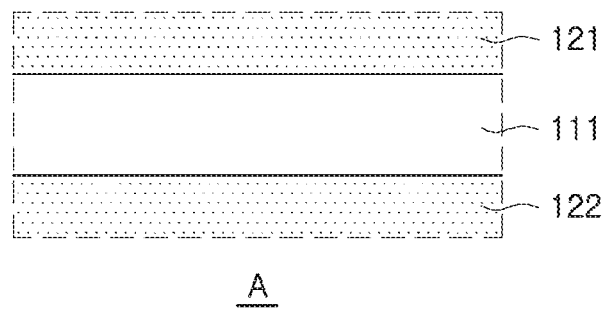
FIG. 3 is an enlarged view of area A of FIG. 2.

FIG. 3 is an enlarged view of area A of FIG. 2.

Hereinafter, an all-solid battery 100 according to an embodiment will be described with reference to FIGS. 1 to 3.

The all-solid battery 100 according to an embodiment includes a body 110 that includes a solid electrolyte layer 111, and an anode layer 121 and a cathode layer 122 alternately stacked with the solid electrolyte layer 111 interposed therebetween, first and second external electrodes 131 and 132 disposed on external surfaces of the body 110. The anode layer 121 and the cathode layer 122 include an active electrode material, and the active electrode material included in the anode layer 121 and the cathode layer 122 may be the same non-polar material.

In the body 110, the solid electrolyte layer 111, the anode layer 121, and the cathode layer 122 are alternately stacked.

The body 110 may have a structure in which the solid electrolyte layer 111, the anode layer 121, and the cathode layer 122 are each one, and the anode layer 121 is disposed on one surface of the solid electrolyte layer 111, and the cathode layer 122 is disposed on the other surface thereof.

Alternatively, the body 110 may have a structure in which the solid electrolyte layer 111, the anode layer 121, and the cathode layer 122 are each plural, and the anode layer 121 and the cathode layer 122 are alternately stacked with the solid electrolyte layer 111 interposed therebetween.

Although the specific shape of the body 110 is not particularly limited, as illustrated, the body 110 may be formed in a hexahedral shape or the like.

The body 110 includes first and second surfaces opposing each other in the thickness direction (a Z direction), third and fourth surfaces connected to the first and second surfaces and opposing each other in the longitudinal direction (an X direction), and fifth and sixth surfaces connected to the first and second surfaces, connected to the third and fourth surfaces, and opposing each other in the width direction (a Y direction).

The plurality of solid electrolyte layers 111 forming the body 110 are not particularly limited as long as they are oxide-based solid electrolyte layers, and for example, may include an oxide-based solid electrolyte of a glass ceramic series having a NASICON structure, capable of being sintered at 1000° C. or less.

The oxide-based solid electrolyte having a NASICON structure has a relatively high conductivity and is also stable in the air.

In detail, the oxide-based material having the NASICON structure may have ion conductivity of $1 \times 10^{-4}$ S/cm or more.

When the plurality of solid electrolyte layers 111 include an oxide-based material having a NASICON structure, the all-solid battery according to an embodiment may have relatively high ion conductivity.

Examples of the oxide-based solid electrolyte having a NASICON structure include phosphate containing lithium.

In detail, the phosphate may include lithium phosphate salt ($Li_{1+x}Al_xTi_{2-x}(PO_4)_3$) complexed with titanium (Ti), or the like.

Alternatively, Ti may be partially or fully substituted with a tetravalent transition metal such as Ge, Sn, Hf, or Zr.

Further, to increase the Li content, Ti may be partially substituted with a trivalent transition metal such as Al, Ga, In, Y, or La.

Phosphate containing lithium (Li) and having a NASICON structure may be, in more detail, a Li—Al—Ge—PO$_4$— based material, for example, LAGP ($Li_{1+x}Al_xGe_{2-x}(PO_4)_3$), LATP ($Li_{1+x}Al_xTi_{2-x}(PO_4)_3$), or the like.

In detail, a Li—Al—Ge—PO$_4$ based material to which the same transition metal as the transition metal included in the anode layer 121 and the cathode layer 122 is added in advance may be used as the material of the solid electrolyte layer 111.

For example, when the anode layer 121 and the cathode layer 122 include phosphates including Co and Li, the Li—Al—Ge—PO$_4$ based material including Co added in advance may be included in the solid electrolyte layer 111. In this case, the transition metal contained in the electrode active electrode material may be prevented from eluting into the electrolyte.

As the material of the solid electrolyte layer 111 as described above, various oxide-based solid electrolytes may be used. As a detailed example, the oxide-based solid electrolyte may be Li$_{1.5}$Al$_{0.5}$Ge$_{1.5}$(PO$_4$)$_3$ (LAGP), Li$_{1.3}$Al$_{0.3}$Ti$_{1.7}$(PO$_4$)$_3$ (LATP), or the like.

Since the solid electrolyte layer 111 includes Li$_{1.5}$Al$_{0.5}$Ge$_{1.5}$(PO$_4$)$_3$ (LAGP) or Li$_{1.3}$Al$_{0.3}$Ti$_{1.7}$(PO$_4$)$_3$ (LATP), a low-temperature sintering process in the range of 600 to 900° C. may be performed.

According to an embodiment of the present disclosure, as described later, the material of the cathode layer 122 and the anode layer 121 that are the active electrode layers, and the material of the solid electrolyte layer 111, in the all-solid battery 100, are combined as a material capable of low temperature co-sintering in the range of 600 to 900° C., thereby producing an all-solid battery in a low temperature co-sintering process.

The plurality of solid electrolyte layers 111 may include an oxide-based material having a NASICON structure and lithium-ion conducting glass-ceramics (LIC-GC).

The plurality of solid electrolyte layers 111 further include Lithium-Ion Conducting Glass-Ceramics (LIC-GC) in an oxide-based material having a NASICON structure, thereby preventing interfacial side reactions with the anode layer and the cathode layer, which are active electrode layers, and reducing resistance by reduction in pores, and thus, improving ionic conductivity properties.

For example, according to an embodiment of the present disclosure, since the solid electrolyte layer 111 further includes Lithium-Ion Conducting Glass-Ceramics (LIC-GC) together with the oxide-based material having a NASICON structure, pores in the solid electrolyte layer 111 are filled with the Lithium-Ion Conducting Glass-Ceramics (LIC-GC), thereby reducing resistance, improving networking between grains when crystal is formed after co-sintering, and improving lithium ion speed faster.

The solid electrolyte layer 111 may include Lithium-Ion Conducting Glass-Ceramics (LIC-GC) in an amount of 0.5 to 10 wt % with respect to the solid electrolyte layer 111.

The solid electrolyte layer 111 contains Lithium-Ion Conducting Glass-Ceramics (LIC-GC) in an amount of 0.5 to 10 wt %, thereby preventing interfacial side reactions with the anode layer and the cathode layer as the active electrode layers and reducing the resistance due to the reduction of the pore to improve the ion conductivity characteristics.

If the solid electrolyte layer 111 contains less than 0.5 wt % of Lithium-Ion Conducting Glass-Ceramics (LIC-GC), the content of the Lithium-Ion Conducting Glass-Ceramics (LIC-GC) is relatively small, the resistance reduction effect is relatively low, and an interfacial side reaction with the anode layer and the cathode layer may occur.

When the solid electrolyte layer 111 contains more than 10 wt % of Lithium-Ion Conducting Glass-Ceramics (LIC-GC), the content of Lithium-Ion Conducting Glass-Ceramics (LIC-GC) having a high crystallization temperature is too high, and applying the low temperature sintering process may be difficult.

The thickness of the solid electrolyte layer 111 is not particularly limited, but may be, for example, 1.0 µm or more and 30 µm or less.

The anode layer 121 and the cathode layer 122 are disposed to face each other with the solid electrolyte layer 111 therebetween.

The anode layer 121 and the cathode layer 122 may be alternately disposed to face each other with a solid electrolyte layer therebetween.

The anode layer 121 and the cathode layer 122 may be exposed to the third and fourth surfaces of the body 110, respectively.

Referring to FIG. 2, the first external electrode 131 is disposed on the third surface of the body 110 to be connected to the anode layer 121, and the second external electrode 132 is disposed on the fourth surface of the body 110 to be connected to the cathode layer 122.

The anode layer 121 and the cathode layer 122 may be electrically separated from each other by the solid electrolyte layer 111 disposed therebetween.

The material for forming the anode layer 121 and the cathode layer 122 is not particularly limited, and may be, for example, a conductive paste including an active electrode material, a Li$_3$BO$_3$ (LBO) precursor and a metallic powder.

The active electrode material may be a known material as a material used for the anode layer and the cathode layer which are the active electrode layers of the all-solid battery.

In detail, according to an embodiment, the active electrode material is characterized in that it is the same non-polar material.

For example, the same non-polar active electrode material is included in the anode layer 121 and the cathode layer 122.

As in the embodiment, when the active electrode materials included in the anode layer 121 and the cathode layer 122 are the same material, the composition of both electrode layers is similar, and thus, there is no problem of malfunctioning by the polarity after forming external electrodes of the all-solid battery.

The non-polar material included in the active electrode material may be any one or more of Li$_3$V$_2$(PO$_4$)$_3$, Li$_2$MnO$_3$ and LiFePO$_4$.

On the other hand, both the anode layer 121 and the cathode layer 122 may include Li$_3$BO$_3$ (LBO).

Since the anode layer 121 and the cathode layer 122, which are the active electrode layers, include Li$_3$BO$_3$ (LBO), the bonding characteristics with the solid electrolyte layer may be improved, and the resistance may be reduced due to the reduction of pores, thereby improving the capacity characteristics.

The content of Li$_3$BO$_3$ (LBO) may be included in any one of 5 to 30 wt % in any one anode layer 121 and the cathode layer 122.

Since LBO (Li3BO3) is contained in one of the anode layer 121 and the cathode layer 122 in the amount of 5 to 30 wt % with respect to the one of the anode layer 121 and the cathode layer 122, the bonding characteristics with the solid electrolyte layer may be improved, and the resistance is reduced due to pore reduction to improve capacity characteristics.

According to an embodiment, the anode layer 121 and the cathode layer 122 may include an active electrode material and Li$_3$BO$_3$ (LBO), and may further include a metallic powder.

The metallic powder may be Ag, Cu, Pt, Ni or an Ag—Pd, Ag—Pt or Ag—Cu alloy or the like, and the diameter of the metallic powder particle may be 0.2 µm to 1.0 µm. In detail, the particle diameter thereof may be 0.4 µm to 0.6 µm.

Since the anode layer 121 and the cathode layer 122 further include the metallic powder, there is an effect that a separate current collector layer is not required.

In a general all-solid battery, a separate current collector layer is disposed, and in this case, a problem due to metal oxidation may occur during the firing process, but according to an embodiment of the present disclosure, a separate current collector layer is not required, and thus, the problem as described above does not occur.

In addition, since the anode layer 121 and the cathode layer 122, which are the active electrode layers, include metal powder, electrical conductivity may be increased, and a current collector layer may not be formed separately, thereby simplifying the fabrication process of an all-solid battery.

As the printing method of the conductive paste for forming the anode layer 121 and the cathode layer 122, a screen printing method or a gravure printing method may be used, but an embodiment of the present disclosure is not limited thereto.

The thickness of the anode layer 121 and the cathode layer 122 is not particularly limited, but may be, for example, 1.0 μm or more and 20 μm or less.

The external electrodes 131 and 132 are disposed on the body 110 and may include electrode layers 131a and 132a, respectively, and plating layers 131b and 132b formed on the electrode layers 131a and 132a, respectively.

The external electrodes (131 and 132) may include first and second external electrodes 131 and 132 connected to the anode layer 121 and the cathode layer 122, respectively.

In more detail, the electrode layers 131a and 132a may be fired electrodes including a conductive metal and glass, or resin-based electrodes including a conductive metal and a resin.

In addition, the electrode layers 131a and 132a may have a form in which plastic electrodes and resin electrodes are sequentially formed on a body.

As the conductive metal included in the electrode layers 131a and 132a, a material having excellent electrical conductivity may be used and is not particularly limited. For example, the conductive metal may be one or more of nickel (Ni), copper (Cu) and alloys thereof.

The plating layers 131b and 132b serve to improve mounting characteristics. The type of the plating layers 131b and 132b is not particularly limited, and may be a plating layer including at least one of Ni, Sn, Pd, and alloys thereof, and may be formed of a plurality of layers.

In more detail, the plating layers 131b and 132b may be Ni plating layers or Sn plating layers, and Ni plating layers and Sn plating layers may be sequentially formed on the electrode layers 131a and 132a. In some embodiments, the Sn plating layer, the Ni plating layer, and the Sn plating layer may be sequentially formed. In addition, the plating layers 131b and 132b may also include a plurality of Ni plating layers and/or a plurality of Sn plating layers.

According to an embodiment, a protective layer 140 may be further disposed on the external surface of the body 110.

The protective layer 140 serves to improve moisture resistance reliability by blocking the moisture penetration path.

In addition, the protective layer 140 may prevent the penetration of moisture into the body through the external surface of the body by sealing the fine pores or cracks of the body 110.

In addition, since the protective layer 140 does not include a conductive metal and is insulative, the protective layer 140 is disposed on the external surface of the body 110, which may be more effective in shock absorption and stress propagation suppression.

In the case of a related art lithium (Li) ion battery, since an external package is provided, there is no problem of poor moisture resistance, and thus, no separate protective layer is necessary.

However, in the case of the recent all-solid battery, there are two types of having an external package and no external package, of which an all-solid battery having an additional external package does not require a separate protective layer, but in the case in which an external package is not provided, a problem of poor moisture resistance may occur.

An all-solid battery according to an embodiment of the present disclosure is a sintered chip all-solid battery without an external package, and a problem of poor moisture resistance may occur depending on the type of electrolyte used.

According to an embodiment of the present disclosure, since the protective layer 140 is disposed on the external surface of the body 110, poor moisture resistance may be prevented, and thus, reliability may be improved.

The protective layer 140 may include at least one of $Al_2O_3$, $SiO_2$, $ZrO_2$, $Ta_2O_3$, $TiO_2$ or $Si_3N_4$.

Accordingly, the protective layer 140 may include any one or more, such as $Al_2O_3/SiO_2$ and $Al_2O_3/TiO_2$.

The $Al_2O_3$ is an advantageous material in forming a film of a relatively high density, and since the protective layer 140 includes $Al_2O_3$, a protective layer having excellent moisture resistance may be formed.

On the other hand, since $SiO_2$ and $TiO_2$ are excellent in adhering to the surface of a body, compared with an epoxy resin or an inorganic compound, $SiO_2$ and $TiO_2$ may be more advantageous in forming a protective layer.

$Si_3N_4$ containing nitride is more inexpensive than $SiO_2$, but has the same coating properties, and thus, a relatively more advantageous effect may be obtained.

However, any material for the formation of the protective layer 140 may be used as long as it is not a material having electronic conductivity and does not react with carbon dioxide in air or moisture, and thus, the material thereof is not limited thereto.

The protective layer 140 may be formed using an atomic layer deposition (ALD) method, a spray dry method, a sputtering method, or the like.

In detail, when forming the protective layer 140 by the atomic layer deposition (ALD) method, there is an advantage that the coating of the thin film to a very small gap may be performed.

The protective layer 140 may include a multilayer thin film of two or more layers. When the protective layer 140 is formed using an atomic layer deposition (ALD) method, a spray dry method, a sputtering method, or the like, since a thin film may be formed, the protective layer 140 may be formed in multiple layers of at least two or more layers.

When the protective layer 140 has the form of a multilayer thin film of two or more layers, the effect of improving moisture resistance characteristics may be more excellent than that of a single layer.

As set forth above, according to an embodiment, by combining the material of the anode layer and the cathode layer, which are the active electrode layers in the all-solid battery, and the material of the solid electrolyte layer, into a material capable of low temperature co-sintering, an all-solid battery may be produced in a low temperature co-sintering process.

In addition, according to an embodiment, the solid electrolyte layer includes an oxide-based material having a NASICON structure and Lithium-Ion Conducting Glass-Ceramics (LIC-GC), thereby preventing interfacial side reactions with the anode layer and the cathode layer as active electrode layers and improving ionic conductivity properties by reduction of resistance due to pore reduction.

In addition, since the anode layer and the cathode layer, which are the active electrode layers, include LBO, the bonding properties with the solid electrolyte layer may be improved, and the resistance may be reduced due to the reduction of pores, thereby improving capacity characteristics.

In addition, since the anode layer and the cathode layer, which are the active electrode layers, include metal powder, the electrical conductivity may be increased, and the current collector layer may not be formed separately, thereby simplifying the fabrication process of the all-solid battery.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An all-solid battery comprising:
   a body including a solid electrolyte layer and an anode layer and a cathode layer alternately stacked with the solid electrolyte layer interposed therebetween;
   first and second external electrodes disposed on external surfaces of the body; and
   a protective layer including at least one of $Al_2O_3$, $SiO_2$, $ZrO_2$, $Ta_2O_3$, $TiO_2$ or $Si_3N_4$, and disposed directly on one or more of the external surfaces of the body,
   wherein the anode layer and the cathode layer include an active electrode material,
   wherein the active electrode material included in the anode layer and the cathode layer includes the same non-polar-based material,
   wherein the solid electrolyte layer comprises Lithium-Ion Conducting Glass-Ceramics (LIC-GC) together with an oxide-based material having a NASICON structure in which a transition metal the same as a transition metal included in the anode layer and the cathode layer is included, and pores in the solid electrolyte layer are filled with the Lithium-Ion Conducting Glass-Ceramics (LIC-GC), and
   wherein end portions of the protective layer are covered by the first and second external electrodes, respectively, and a central portion of the protective layer, disposed between the end portions, is an exterior portion of the all-solid battery.

2. The all-solid battery of claim 1, wherein the non-polar-based material included in the active electrode material is one or more of $Li_3V_2(PO_4)_3$, $Li_2MnO_3$ and $LiFePO_4$.

3. The all-solid battery of claim 1, wherein the anode layer and the cathode layer further comprises a metal powder particle containing silver (Ag), copper (Cu), platinum (Pt), nickel (Ni), or any one or more of Ag—Pd alloy, Ag—Pt alloy and Ag—Cu alloy.

4. The all-solid battery of claim 3, wherein a diameter of the metal powder particle is 0.2 µm or more and 1.0 µm or less.

5. The all-solid battery of claim 1, wherein each of the anode layer and the cathode layer has a thickness of 1.0 µm or more and 20 µm or less.

6. The all-solid battery of claim 1, wherein the oxide-based material having the NASICON structure has ion conductivity of $1 \times 10^{-4}$ S/cm or more.

7. The all-solid battery of claim 1, wherein the oxide-based material having the NASICON structure is $Li_{1+x}Al_xGe_{2-x}(PO_4)_3$ (LAGP) or $Li_{1+x}Al_xTi_{2-x}(PO_4)_3$ (LATP).

8. The all-solid battery of claim 1, wherein the solid electrolyte layer comprises the Lithium-Ion Conducting Glass-Ceramics (LIC-GC) in an amount of 0.5 to 10 wt % with respect to the solid electrolyte layer.

9. The all-solid battery of claim 1, wherein the solid electrolyte layer has a thickness of 1.0 µm or more and 30 µm or less.

10. The all-solid battery of claim 1, wherein the active electrode material included in the anode layer and the cathode layer is the same non-polar-based material.

11. The all-solid battery of claim 1, wherein each of the anode layer and the cathode layer further comprises $Li_3BO_3$ (LBO).

12. The all-solid battery of claim 11, wherein a content of $Li_3BO_3$ (LBO) in one of the anode layer and the cathode layer is 5 to 30 wt % with respect to the one of the anode layer and the cathode layer.

13. The all-solid battery of claim 1, wherein the non-polar-based material included in the active electrode material is one or more of $Li_3V_2(PO_4)_3$ and $LiFePO_4$.

14. The all-solid battery of claim 1, wherein the protective layer is in contact with the solid electrolyte layer.

15. The all-solid battery of claim 1, wherein the transition metal includes Co.

* * * * *